No. 609,254. Patented Aug. 16, 1898.
A. VREELAND.
BICYCLE TIRE.
(Application filed July 2, 1898.)
(No Model.)
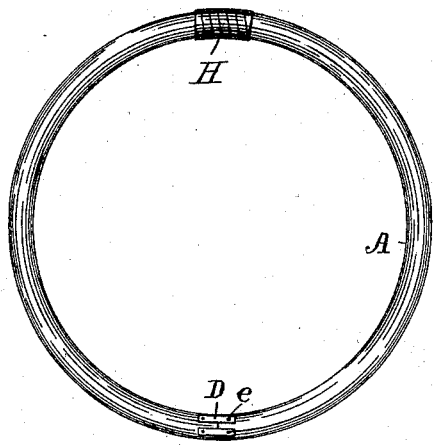
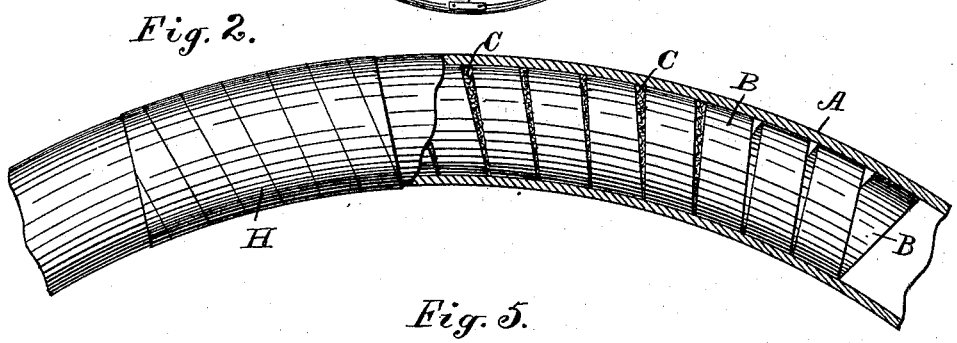
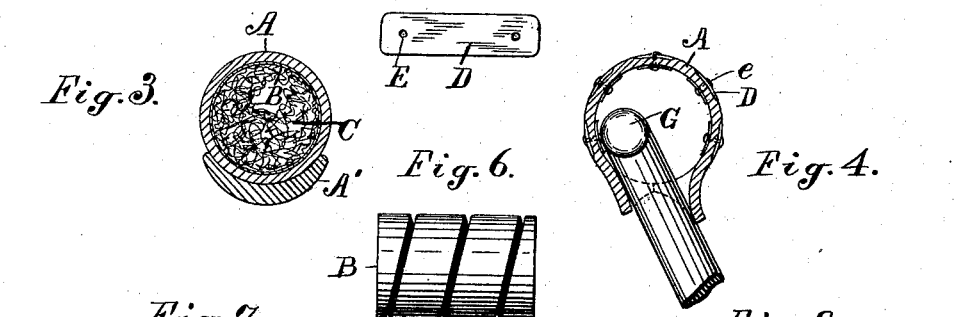
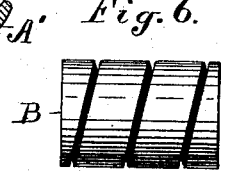
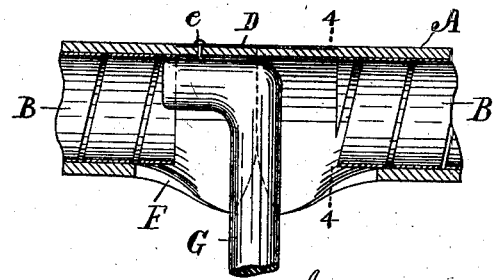
Attest:
L. Lee.
Edw. P. Kinsey
Inventor.
Aaron Vreeland per
Thomas S. Crane, Atty.

UNITED STATES PATENT OFFICE.

AARON VREELAND, OF EAST ORANGE, NEW JERSEY.

BICYCLE-TIRE.

SPECIFICATION forming part of Letters Patent No. 609,254, dated August 16, 1898.

Application filed July 2, 1898. Serial No. 685,022. (No model.)

*To all whom it may concern:*

Be it known that I, AARON VREELAND, a citizen of the United States, residing at East Orange, county of Essex, State of New Jersey, have invented certain new and useful Improvements in Bicycle-Tires, fully described and represented in the following specification and the accompanying drawings, forming a part of the same.

The object of the present invention is to furnish a means for internally bracing a cushion-tire for bicycles, so that it may possess permanently elastic qualities.

The invention consists partly in the use of a spiral spring combined with a curled-hair stuffing, partly in the means for constructing such a tire from a piece of hose by joining the ends of such hose with strips of sheet metal, and partly in the means for introducing a stake within the tire to rivet such strips.

Spiral springs have been heretofore used to reinforce a rubber tire, but where such springs are used without the hair stuffing which I employ there is nothing to assist them in regaining their form if bent beyond the limit of elasticity. Felt also has been used for stuffing tires, but does not possess originally the resilience of metal nor does it retain its form so long under the wear and tear of a bicycle-tire. To introduce the spiral spring into the tire without opening the same throughout upon the inner side, I make the tire of one or two straight pieces of hose of suitable length and insert the coiled spring into the same from one end, the two ends of the tube being then joined together by flat strips applied to the inner and outer sides and rivets passed through such strips and the rubber. The inner side of the tire is slit adjacent to the joint to introduce the riveting-stake. A wrapping of adhesive tape is applied to the strips upon the outer side of the tire to protect them from abrasion or displacement by projections from the road.

In the annexed drawings, Figure 1 exhibits a tire formed of two pieces of rubber hose joined at the ends, as described, the lower side of the tire showing the strips before they are covered and the joint at the upper side exhibiting the winding of the adhesive tape. Fig. 2 is a view of part of the tire upon a larger scale, showing one of the joints covered by adhesive tape and the tube in section at the right-hand end with the spiral spring therein and a portion of the spring stuffed tightly with the curled hair. Fig. 3 is a cross-section of the tire and the wheel-rim upon which it is used with the spiral spring inserted therein and stuffed with the curled hair. Fig. 4 is a cross-section of the tire near the joint with the riveting-stake, the section being taken on line 4 4 in Fig. 8. Fig. 5 shows one of the metal joint-strips, and Fig. 6 the short section of a spiral spring. Fig. 7 shows the joint at the under side of the tire with the stake-opening laced. Fig. 8 is a longitudinal section of the tire at the joint with the stake inserted through the opening.

A designates the piece of rubber tube or hose from which the tire is formed, and B the spiral spring, which is preferably formed of sheet-steel about one-fiftieth of an inch in thickness and three or four eighths of an inch in width and the coils wound with an interspace of about one-eighth of an inch.

C designates the stuffing of unfelted curled hair, it having been found that felting disposes the fibers more or less in one direction, and thus deprives the mass of a great portion of its elasticity.

D are the metal strips, which are furnished in their opposite ends with holes E and applied to the inner and outer sides of the tube across the joint, as shown in Figs. 4 and 7.

The spiral spring is inserted in the rubber tube A and stuffed tightly with the curled hair before the ends of the tube are joined together, such ends being formed with a slit or opening F upon the inner side sufficient to introduce a riveting-stake G, which serves to support the rivets $e$, which are inserted in the holes E and through the rubber tube, as shown in Fig. 7, which exhibits the operation of riveting the first strips upon the joint. No joint-strips are required upon the inner side of the tire, and Fig. 4 shows five pairs of strips applied to the remainder of the joint, with the stake inserted through the opening F. When the riveting is completed, the joint-strips render the joint as strong and resilient as the parts which contain the spiral springs B; but, if desired, a short section of the spiral spring, as shown in Fig. 6, may be stuffed with the curled hair and inserted through the opening F between the ends of the main spring B. The opening is then laced together by a cord c, as shown in Fig. 7, and the joint wrapped with adhesive tape H over the entire surface of the joint-strips D and beyond the ends of the same for a little way upon the rubber tire, as shown in Figs. 1 and 2.

The broad thin form of spiral spring shown in the drawings possesses great strength and resilience and is much less likely to be injured by concussion than coils formed of round wire. It is, moreover, especially adapted for use with an internal stuffing of fibrous material, as the coils of the spring cover almost the entire exterior of such stuffing and present broad surfaces to contact therewith, and thus receive its support much more effectively than where the coils are formed of wire which has but a narrow bearing upon a fibrous stuffing and tends to cut into the same if subjected to pressure. The combination of the spring with broad flat coils and the curled hair thus possesses peculiar advantages.

It will be understood that the hose or tubing must be open at the ends in order to introduce the spiral spring, which may be made to tightly fit the tubing by screwing its coils closer when inserting it therein. Such tubing is readily bent into a ring after the spring and stuffing of curled hair are inserted and the ends joined in the manner already described.

Having thus set forth the nature of the invention, what is claimed herein is—

1. In a bicycle-tire, the combination, with a piece of hose or tubing A bent into a ring and the ends joined by the flat strips D and rivets e as described, of a spiral spring fitted tightly to the interior of the tubing and tightly stuffed with curled hair, as and for the purpose set forth.

2. In a bicycle-tire, the combination, with a piece of rubber hose or tubing A bent into a ring and the ends joined by a series of flat metallic strips D fitted longitudinally inside and outside of the tubing across the joint, and secured by the rivets e as described, of the spiral spring having broad thin coils fitted tightly within the tubing, and tightly stuffed with curled hair, substantially as herein set forth.

3. In a bicycle-tire, the combination, with a piece of hose or tubing A bent into a ring and the ends formed with short slots or openings F as described, of a spiral spring fitted tightly to the interior of the tube and tightly stuffed with curled hair, as set forth, the series of metal strips D applied to the inner and outer sides of the tube across the joint and secured by the rivets e, and a lacing c applied to the opening F when the riveting is completed, substantially as herein set forth.

4. In a bicycle-tire, the combination, with a piece of hose or tubing A bent into a ring and the ends formed with short slots or openings F, as described, of a spiral spring fitted tightly to the interior of the tubing and tightly stuffed with curled hair, as set forth, the series of metal strips D applied to the inner and outer sides of the tubing across the joint and secured by the rivets e, the lacing c applied to the opening F when the riveting is completed, and the wrapping of adhesive tape H applied to the exterior of the tubing over such lacing and metal strips, substantially as herein set forth.

In testimony whereof I have hereunto set my hand in the presence of two subscribing witnesses.

AARON VREELAND.

Witnesses:
 THOMAS S. CRANE,
 EDWARD F. KINSEY.